United States Patent
Tsugimura

(10) Patent No.: US 8,817,318 B2
(45) Date of Patent: Aug. 26, 2014

(54) PRINTER

(75) Inventor: Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1414 days.

(21) Appl. No.: 12/539,924

(22) Filed: Aug. 12, 2009

(65) Prior Publication Data

US 2010/0053642 A1 Mar. 4, 2010

(30) Foreign Application Priority Data

Aug. 29, 2008 (JP) ................. 2008-221766

(51) Int. Cl.
- G06K 15/02 (2006.01)
- H04N 1/32 (2006.01)
- G06F 17/00 (2006.01)

(52) U.S. Cl.
CPC .... *H04N 1/32112* (2013.01); *H04N 2201/3271* (2013.01); *H04N 2201/325* (2013.01); *H04N 2201/328* (2013.01); *H04N 2201/3226* (2013.01); *H04N 2201/0082* (2013.01)
USPC ........... 358/1.2; 358/1.15; 715/234; 715/509; 715/501.1

(58) Field of Classification Search
USPC ........................................ 358/1.2
See application file for complete search history.

(56) References Cited

U.S. PATENT DOCUMENTS

| 8,538,950 | B2 * | 9/2013 | Cho ........................... 707/711 |
| 2006/0282760 | A1 * | 12/2006 | Tanaka ....................... 715/509 |
| 2007/0201115 | A1 * | 8/2007 | Yoshida et al. .............. 358/538 |
| 2007/0223013 | A1 * | 9/2007 | Mizutani ..................... 358/1.2 |
| 2007/0226748 | A1 * | 9/2007 | Mizutani ..................... 719/310 |
| 2008/0013111 | A1 * | 1/2008 | Sakurai et al. ................ 358/1.2 |
| 2008/0288859 | A1 * | 11/2008 | Yuan et al. ................... 715/234 |

FOREIGN PATENT DOCUMENTS

| JP | 9-204439 A | 8/1997 |
| JP | 2003-152991 A | 5/2003 |
| JP | 2006-005544 A | 1/2006 |
| JP | 2006-155281 | 6/2006 |
| JP | 2006-165783 A | 6/2006 |
| JP | 2007-164538 A | 6/2007 |
| JP | 2007-259352 | 10/2007 |
| JP | 2007-259353 | 10/2007 |
| JP | 2007-267373 A | 10/2007 |
| JP | 2008-023713 A | 2/2008 |

OTHER PUBLICATIONS

JP Office Action dtd Jun. 22, 2010, JP Appln. 2008-221766, English translation.

* cited by examiner

*Primary Examiner* — Thomas D Lee
*Assistant Examiner* — Pawandeep Dhingra
(74) *Attorney, Agent, or Firm* — Banner & Witcoff, Ltd.

(57) ABSTRACT

A printer includes a retrieving unit, an index image generating unit, and a list printing unit. The retrieving unit retrieves a file including document data. The content acquiring unit acquires information of a table of contents of the document data from the file. The index image generating unit generates an index image depicting the table of contents of the file based on the information of the table of contents. The list printing unit prints a list image containing the index image.

18 Claims, 3 Drawing Sheets

PRINTER

CROSS REFERENCE TO RELATED APPLICATION

This application claims priority from Japanese Patent Application No. 2008-221766 filed Aug. 29, 2008. The entire content of the priority application is incorporated herein by reference.

TECHNICAL FIELD

The invention relates to a printer to print a list of index images corresponding to a plurality of files.

BACKGROUND

In recent years, a printer capable of printing a file stored in a removable storage medium, such as a memory card, without using an image processing device, such as a personal computer (hereinafter referred to as "PC"), has become widely used. This type of printer is capable of directly printing a file stored in a memory card by inserting the memory card into the printer. Files to be printed include not only bit map image files of photographs taken by a digital still camera but also document files containing information on characters and images generated by a PC. Further, such a printer has an index printing function for arranging index images of each file on a recording sheet and printing the same, so that outlines of a plurality of files stored in the memory card can be easily confirmed at a glance.

Application software functioning in the PC, such as utility software included in a package of a printer as a peripheral of a PC, has the index printing function as described above.

SUMMARY

Conventionally, if a document file containing a plurality of pages therein is to be index-printed, an index image generated from a first page of the document file is printed as a representative page specifying the substance of the document file. However, if a page having the specific page number, such as the first page, is uniformly determined as a page to be index-printed, a page that a user can easily recognize the substance of the file is not always selected as the page to be index-printed. In other words, if the page having the specific page number to be index-printed does not include any information that the user can presume an outline of the file, the user cannot acquire useful information about the file from a result of the index print. Accordingly, the index printing function cannot be fully utilized.

The invention is made to solve the above problems. That is, it is an object of the invention to provide a printer capable of printing index images containing useful information for a user when a list of index images of document files is printed.

In order to attain the above and other objects, the invention provides a printer. The printer includes a retrieving unit, an index image generating unit, and a list printing unit. The retrieving unit retrieves a file including document data. The content acquiring unit acquires information of a table of contents of the document data from the file. The index image generating unit generates an index image depicting the table of contents of the file based on the information of the table of contents. The list printing unit prints a list image containing the index image.

According to another aspect, the present invention provides a computer-readable storage medium storing a set of program instructions executable on a computer retrieving a file including document data. The program instructions includes (a) acquiring information of a table of contents of the document data from the file, (b) generating an index image depicting the table of contents of the file based on the information of the table of contents, and (c) outputting a list image containing the index image for printing.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, one embodiment of the present invention will be described with reference to FIGS. 1 to 3.

[Explanation of a Configuration of Printer 1]

Figure 1:
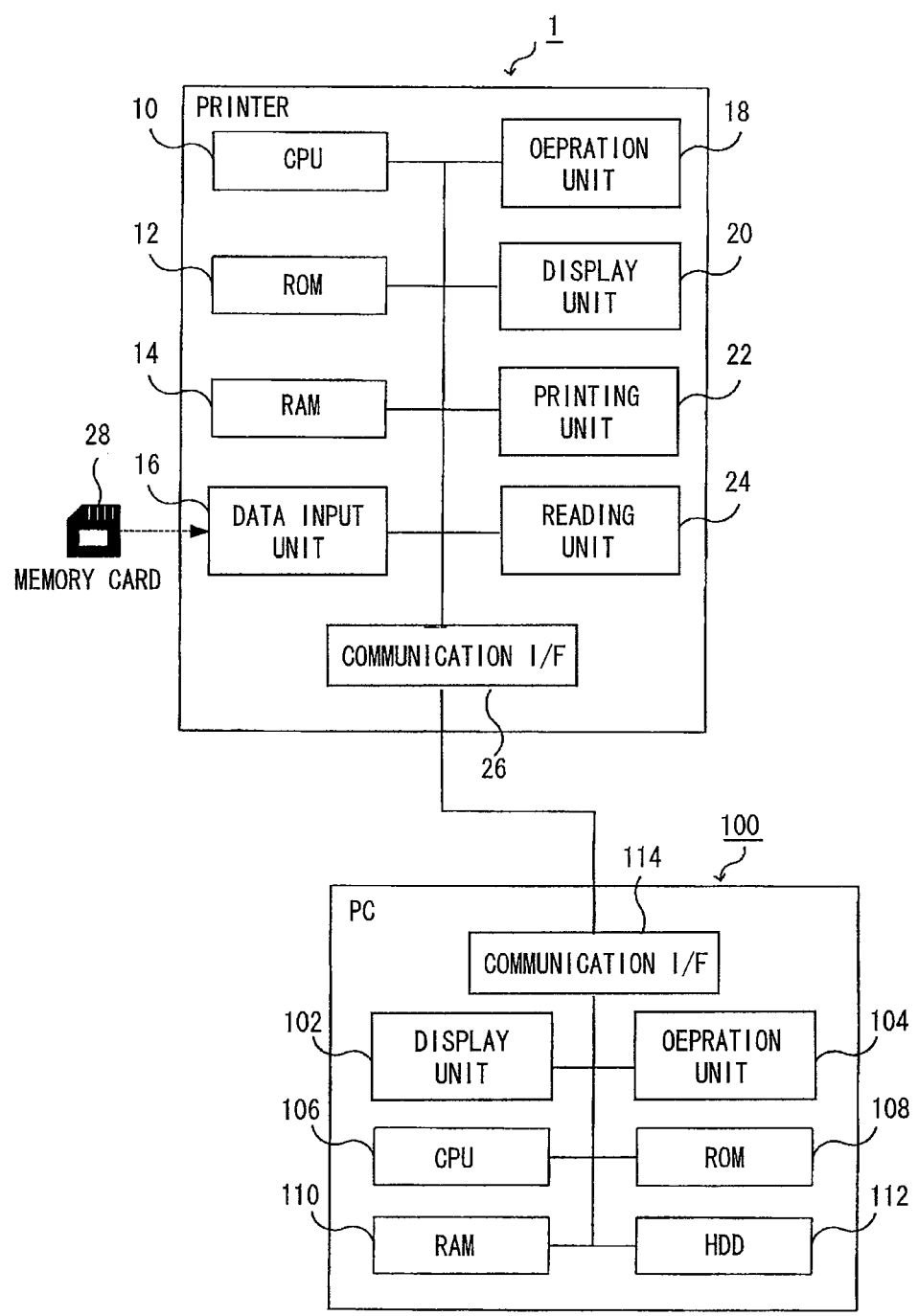
FIG. 1 is a block diagram diagrammatically showing a structure of a printer and a personal computer according to an embodiment.

FIG. 1 is a block diagram showing a configuration of a printer 1 and a personal computer (hereinafter referred to as "PC") 100 connected to the printer 1. The printer 1 is a multifunction peripheral having several functions, such as a printer function for printing an image on a recording sheet, a scanner function for scanning an image recorded on a recording sheet and computerizing read information, and a copier function for duplicating an image read from an original document on a recording sheet. As shown in FIG. 1, the printer 1 includes a CPU (central processing unit) 10, a ROM (read-only memory) 12, a RAM (random access memory) 14, a data input unit 16, an operation unit 18, a display unit 20, a printing unit 22, a reading unit 24, and a communication interface (hereinafter referred to as "communication I/F") 26.

The CPU 10 is a device for executing several calculations in accordance with programs and data stored in the ROM 12. The CPU 10 executes calculation processing in connection with the printer function, the scanner function and the copier function.

The ROM 12 is a storage device for storing programs and data even if a power of the printer 1 is switched off. The ROM 12 stores programs to control the printer function, the scanner function and the copier function, and also stores read only data which is normally not updated.

The RAM 14 is a storage device having a direct access from the CPU 10 and is used as a main memory. The RAM 14 stores several programs read out from the ROM 12 to be executed by the CPU 10. The RAM 14 also stores results of each calculation executed by the CPU 10 and several data. When the CPU 10 executes the calculation processing in connection with the above functions, the RAM 14 stores programs, for executing each calculation processing, that are read out from the ROM 12. In accordance with the programs stored in the RAM 14, the CPU 10 executes the calculation processing.

The data input unit 16 has a connector to connect a memory card 28 that is a removable storage medium having a flash memory therein. The data input unit 16 has a function as a reader/writer capable of reading and writing data with respect to the memory card 28.

The operation unit 18 has key switches, such as numeric keys, alphabetical keys, and function keys. The operation unit 18 inputs commands into the CPU 10 in response to key operations by a user. The display unit 20 is an output device including a liquid crystal display, and displays information on an operating condition of the printer 1, operation guidance, and an index image of a file.

The printing unit 22 is, for example prints an image on a recording sheet based on control from the CPU 10 through an inkjet type method or a laser type method, for example. The reading unit 24 is a device to scan an image recorded on a recording sheet, to convert the read image into digital data, and to input the digital data into the CPU 10.

The communication I/F 26 is a hardware interface for connecting the printer 1 to other information processing devices. The communication I/F 26 uses a serial bus such as a USB (universal serial bus) or a network adapter. As shown in FIG. 1, the printer 1 is communicably connected to the PC 100 through the communication I/F 26.

The PC 100 has a structure the same as a well-known computer device. The PC 100 includes a display unit 102 having a liquid crystal display, an operation unit 104 having a mouse and a keyboard, a CPU 106 for executing several calculation processes, a ROM 108 for storing programs, such as IPL (initial program loader) and BIOS (basic input/output system) and read only data, a RAM 110 which serves as a main memory that the CPU 106 accesses directly, a hard disk drive (hereinafter referred to as "HDD") 112 which is an auxiliary storage device for storing an OS (operating system), application programs and several data files, and a communication I/F 114 which is a hardware interface for connecting the PC 1 to a printer and other peripherals and for connecting the PC 1 to a network.

The printer 1 according to the embodiment has a direct printing function for printing data that is directly read from the memory card 28, used for a digital camera, connected to the data input unit 16, in addition to a function for performing a printing operation, as a peripheral of the PC 100, based on inputted print data inputted from the PC 100. As a function relating to the direct printing function, the printer 1 generates index images corresponding to each of a plurality of document files (for example, PDF (portable document format) files) stored in the memory card 28. The printer 1 arranges the index images to list, and prints the list of the index images. In this process, the CPU 10 of the printer 1 acquires information of a table of contents from the file and executes a process for generating the index image corresponding to the file based on the information of the table of contents.

[Explanation of Print Processing of a List of Index Images]

Next, an example of print processing of a list of index images will be described with reference to FIG. 2. FIG. 2 is an explanatory diagram illustrating a procedure for generating index images of files and printing a list of the index images. In this example, it is assumed that three index images corresponding to three files (a file 1, a file 2 and a file 3) stored in a file folder ((a) of FIG. 2) in the memory card 28 are printed. As shown in FIG. 2(e), the CPU 10 of the printer 1 sequentially generates the index image for each of the files, prints the index images such that the index images is disposed on a predetermined position of the recording sheet. That is, the printer 1 prints a list in which the generated index images are disposed on the prescribed position. Here, the CPU 10 acquires the information corresponding to the table of contents from the file of which the index image is to be printed, and generates the index image based on the acquired information of the table of contents. The method to acquire the information of the table of contents from the file varies in accordance with the composition of the file.

Figure 2:
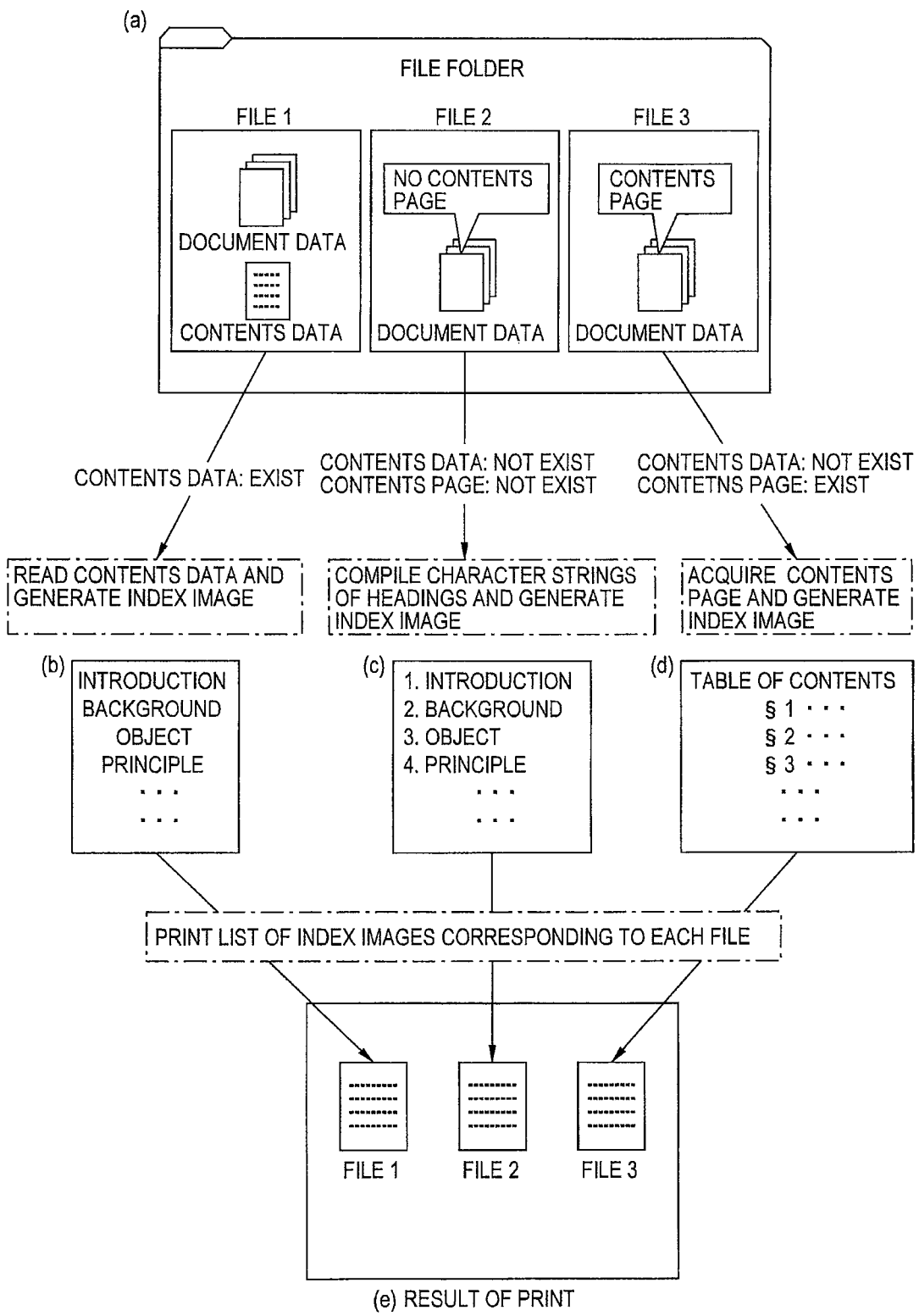
FIG. 2 is an explanatory diagram illustrating a procedure for generating index images of files and printing a list of the index images.

In the example shown in FIG. 2, the file 1 includes contents data in addition to document data which is main data of the file 1. The contents data accompanies the main data (the document data), and is attribute data that retains information on the table of contents listing headings of the document. Contents data is used, for example, when an outline of a document is acquired on application software. If the file includes the contents data, the CPU 10 reads the information described in the contents data and generates the index image in which the read information is depicted (see (b) in FIG. 2).

The file 2 does not include the contents data. Further, the document data in the file 2 does not contain a page describing the table of contents (a contents page). In this case, the CPU 10 obtains character strings of the headings described in the document data and compiles the obtained character strings so as to generate the index image (FIG. 2(c)).

The file 3 does not include the contents data, but the document data contains the contents page. In this case, the CPU 10 acquires the contents page and generates the index image by enlarging or reducing the size of the entire contents page or an appropriate portion of the contents page (see (d) in FIG. 2).

[Explanation of Index Image Generating Processing]

Next, detailed explanation about the procedure for generating the index images from respective files in the above described print processing will be described with reference to FIG. 3.

Figure 3:
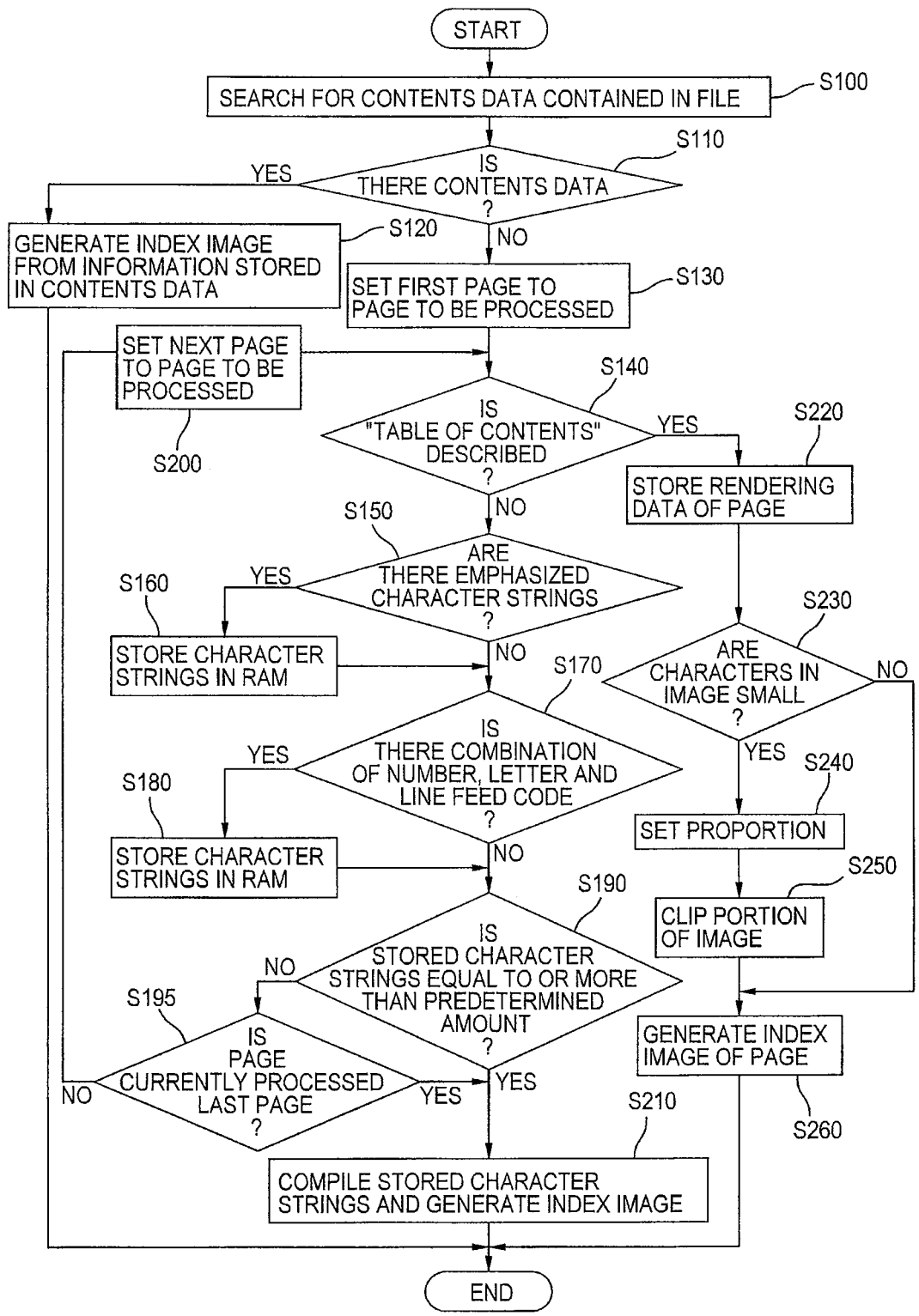
FIG. 3 is a flowchart illustrating a procedure for generating the index image.

FIG. 3 is a flowchart illustrating a procedure for generating the index image executed by a CPU 10 of the printer 1. The CPU 10 executes the index image generating processing for each of files of which the index images are printed as a list.

In S100 the CPU 10 searches for the contents data contained in the file. In S100 the CPU 10 determines whether or not the file includes the contents data based on the result of the search. If the CPU 10 determines that the file includes the contents data (S110: YES), in S120 the CPU 10 reads information contained in the contents data and generates the index image in which the read information is depicted. That is, the CPU 10 generates an index image depicting the table of contents of the file based on the information read from the contents data. In this process, the size of characters in the index image is set to a size easily and sufficiently legible for a user when the list of the index images is printed. Having generated the index image, the CPU 10 outputs the index image to the printing unit 22 and ends the index image generating processing.

If the CPU 10 determines that the file does not include the contents data (S110: NO), in S130 the CPU 10 sets a first page of the file (document data) as a page to be processed. In S140 the CPU 10 determines whether or not there are headings, such as "a table of contents" or "contents", in the document of the page to be processed indicated by the document data. Here, the CPU 10 determines whether or not the page is applicable to the contents page, based on the determination whether the headings such as "a table of contents" or "contents" are contained in the document of the page to be processed. A method for determining whether the page to be processed is applicable to the contents page is not limited to the above. If the contents page is preliminary defined in a file, information on the definition may be referred to when determining whether the page to be processed is applicable to the contents page.

If the CPU 10 determines that the headings such as "a table of contents" or "contents" are not contained in the document of the page to be processed (S140: NO), that is, if the page is not applicable to the contents page, in S150 the CPU 10 determines whether or not there are emphasized character strings in the document of the page to be processed. Here, the CPU 10 determines whether the character strings correspond to the headings of the document, based on the determination whether the character strings are emphasized by using bold faced characters and/or characters having a larger size than other characters around. If the CPU 10 determines that there are emphasized character strings in the document of the page to be processed (S150: YES), that is, if the CPU 10 determines that the headings of the document are contained in the page to be processed, in S160 the CPU 10 stores the emphatic character strings in the RAM 14 and advances to S170. If the CPU 10 determines that there is no emphasized character string in the document of the page to be processed (S150: NO), the CPU advances to S170.

In S170 the CPU 10 determines whether character strings combined by characters in order of number, letter, and line feed code are contained in the document of the page to be processed. That is, the CPU 10 determines whether the character strings correspond to the headings in the document indicated by the document data, based on the determination whether the character strings are combined in order of number, letter, and line feed code. For example, if a character string "1. Introduction (line feed code)" is contained in the document, the CPU 10 determines that the character string corresponds to the heading of the document. If the CPU 10 determines that the character strings combined by characters in order of number, letter, and line feed code are contained in the document of the page to be processed (S170: YES), that is, if the headings of the document are contained in the page to be processed, in S180 the CPU 10 stores the character strings in the RAM 14 and advances to S190. If the CPU 10 determines that there is no character string combined by characters in order of number, letter, and line feed code in the document of the page to be processed (S170: NO), the CPU 10 advances to S190.

In S190 the CPU 10 determines whether or not the character strings of the headings stored in the RAM 14 in S160 and S180 are accumulated equal to or more than a predetermined amount. If the CPU 10 determines that the stored character strings of the headings are less than the predetermined amount (S190: NO), in S195 the CPU 10 determines whether or not the currently processed page is a last page of the file. If the CPU 10 determines that the currently processed page is the last page of the file (S195: YES), the CPU 10 advances to S210. If the CPU determines that the currently processed page is not the last page of the file, in S200 the CPU 10 sets a next page of the currently processed page as a page to be processed, and returns to S140. If the CPU 10 determines that the character strings of the headings stored in the RAM 14 in S160 and S180 are accumulated equal to or more than the predetermined amount (S190: YES), in S210 the CPU 10 compiles the stored character strings so as to generate the index image of the file. That is, if the CPU 10 determines that the file does not include the content data (S110: NO), if the CPU 10 determines that the document data does not contains the data of the contents page (S140), and if the CPU 10 determines that the document data includes data of the heading (S150: YES or S170: YES), in S210 the CPU 10 generates an index image depicting the table of contents of the file based on the heading. In this process, the size of characters appearing on the index image is set to the size easily and sufficiently legible for a user when the list of the index images is printed. Having generated the index image, the CPU 10 outputs the index image to the printing unit 22 and ends the index image generating processing.

If the CPU 10 determines that the headings such as "a table of contents" or "contents" are contained in the document of the page to be processed (S140: YES), that is, if the page is applicable to the contents page, in S220 the CPU 10 stores rendering data of the page to be processed in a memory for printing. Next, in S230 the CPU 10 determines whether or not the size of the characters on an image of the page to be processed which is stored in the memory for printing is equal to or smaller than a reference size. More specifically, a minimum size (M) is defined as a size of character in the index image such that the user can recognize characters in the index image whose size is equal to or greater than the minimum size. When the characters having the reference size (R) in the image of the page to be processed are enlarged or reduced in a ratio (RA) of a prescribed image size (S1) of the index image to the size (S2) of the entire image of the page to be processed, the enlarged/reduced size of the characters becomes the minimum size. That is, R is obtained as follows: $R=S2/S1\cdot M=1/RA\cdot M$, here $RA=S1/S2$.

In S230, if the CPU 10 determines that the size of the characters appearing on the image of the page to be processed is smaller than the predetermined reference size (S230: YES), the CPU 10 sets an enlargement/reduction proportion that the size of the characters appearing on the image of the page to be processed becomes larger than a predetermined legible size (S240). Here, the legible size is defined by a minimum size of the characters that the user can sufficiently perceive on the printed index image when the characters appearing on the image of the page to be processed are printed to the index image without enlarging or reducing the image. For example, the legible size is two points font size.

Next, in S250 the CPU 10 clips a portion of the image of the page to be processed such that an image obtained by enlarging or reducing the portion of the image of the page to be processed by the proportion set in S240 has a size equal to or smaller than the prescribed image size of the index image. More specifically, the CPU 10 determines a clip size based on the proportion and a prescribed image size such that a size obtained by multiplying the clip size by the proportion is smaller than or equal to the prescribed image size. The CPU 10 clips the portion of the image of the contents page in the clip size. Here, the clipped portion of the image includes at least part of character in the table of contents. Then, in S260 the CPU 10 enlarges or reduces the clipped portion in the set proportion so as to generate, from the clipped portion, the index image. The CPU 10 outputs the index image to the printing unit 22 and ends the index image generating processing.

In S230, if the CPU 10 determines that the size of the characters on in the image of the page to be processed which is stored in the memory for printing is larger than the predetermined reference size (S230: NO), in S260 the CPU 10 enlarges or reduces the entire image of the page to be processed to the prescribed image size of the index image so as to generate the index image. That is, if the CPU 10 determines that the file does not include the content data (S110: NO), if the CPU 10 determines that the document contains the data of the contents page (S140: YES), in S220 the CPU 10 acquires the data of the contents page and in S260 the CPU 10 generates the index image based on the data of the contents page. Having generated the index image, the CPU 10 outputs the index image to the printing unit 22 and ends the index image generating processing.

[Effect]

The printer 1 according to the embodiment has the following effects. The CPU 10 generates the index image from the information recorded in the contents data. Accordingly, the index image is printed as a list such that the user can know the outline of the document from information about the table of contents in the printed index image.

If the file whose index image is printed as a list does not include the contents data but the document contains the page describing the table of contents (the contents page), the CPU 10 searches for the contents page from the plurality of pages contained in the document and prints the index image of the contents page. Accordingly, the user can easily recognize the contents of the document from the index image.

Even if the file whose index image is printed as a list does not include the contents data and the document of the file does not contain the page describing the table of contents, the CPU 10 is capable of generating the index image of the file by compiling the headings obtained from the document. Accordingly, the printer 1 can print a list of the index images containing the useful information for the user.

When the index image is generated, the CPU 10 controls the characters appearing on the printed index image to have the legible size for the user. Accordingly, legibility of the characters appearing on the printed index image can be ensured. In particular, if the index image is generated by enlarging or reducing the size of the contents page, the enlargement/reduction proportion is set in order to avoid the index image having illegible characters on the index image, and a portion suitable for the set enlargement/reduction proportion is clipped from the image of the contents page. Despite the original size of the characters in the contents page, the CPU 10 can generate the index image in the prescribed image size based on the set enlargement/reduction proportion, so that the user can fully recognize the characters appearing on the index image. In other words, if the characters in the contents page have a relatively large size, the user can recognize the characters appearing on the index image even if the image of the contents page is considerably reduced in size. In this case, provided the contents page is reduced in size to the extent that legibility of the characters appearing on the index image is not impaired, the portion of the image of the contents page to be clipped can be broadened. If the original size of the characters in the contents page is relatively small, the CPU 10 enlarges or slightly reduces the image of the contents page in size so as to ensure the legibility of the characters appearing on the index image. Further, the CPU 10 generates the index image in the prescribed image size by narrowing the clipped portion of the image of the contents page.

[Modification]

While the invention has been described in detail and with reference to specific embodiment thereof, it would be apparent to those skilled in the art that various changes and modifications can be made within the scope and spirit of the invention. Various modifications are conceivable.

In the above described embodiment, an example has been described that the direct printing function allows the printer 1 to print a list of the index images of the plurality of files. In contrast, as application software functioning on the PC 100 connected to the printer 1, the function for printing a list of the index images according to the embodiment may be installed in the PC 100. In this case, the CPU 106 of the PC 100 generates the respective index images from the plurality of files and controls the printer 1 to print a list of the index images.

Further, in the above described embodiment, in an example of the file 3 shown in FIG. 2, the CPU 10 acquires the contents page contained in the file and generates the index image from the contents page by enlarging or reducing the contents page in size. However, the CPU 10 may acquire the contents page contained in the file, specify character strings described in the acquired contents page, and compile the character strings to generate the index image.

Further, in the above described embodiment, the CPU 10 generates the index images ((b), (c), and (d) in FIG. 2) of the respective files and prints a list of the index images generated from the plurality of files ((e) in FIG. 2). However, the CPU 10 may directly generate one index image including information about the index images of the plurality of files. That is, the CPU 10 may generate index data indicative of character strings for generating the index image and layout information of graphic images from each file, and generate one index image file in which the index images of each file are arranged as a list based on the generated index data. Further, the CPU 10 may output the generated index image file as a list.

What is claimed is:

1. A printer comprising:
 a retrieving unit that retrieves a file including document data;
 a controller comprising:
   a content acquiring unit that acquires information of a table of contents of the document data from the file; and
   an index image generating unit that generates an index image depicting the table of contents of the file based on the information of the table of contents; and
 a list printing unit that prints a list image containing the index image,
 the content acquiring unit comprising:
   a first determining unit that determines whether the file includes content data indicative of the table of contents of the document data;
   a second determining unit that determines whether the document data in the file includes a content page containing the table of contents;
   a third determining unit that determines whether the document data in the file includes data of a headline;
   a content data acquiring unit that is configured to acquire the content data from the file;
   a content page acquiring unit that is configured to acquire the content page from the document data; and
   a headline acquiring unit that is configured to acquire the data of the headline from the document data,
 wherein if the first determining unit determines that the file includes the content data, the content data acquiring unit acquires the content data and the index image generating unit generates the index image based on the content data,
 wherein if the first determining unit determines that the file does not include the content data and if the second determining unit determines that the document data contains the content page, the content page acquiring unit acquires the content page and the index image generating unit generates the index image based on the content page, and
 wherein if the first determining unit determines that the file does not include the content data, if the second determining unit determines that the document data does not contain the content page, and if the third determining unit determines that the document data includes data of the headline, the headline acquiring unit acquires the data of the headline from the document data and the index image generating unit generates the index image based on the headline.

2. The printer according to claim 1, wherein the file further includes content data indicative of the table of contents of the document data, wherein the content acquiring unit acquires, from the file, the content data as the information of the table of contents, wherein the index image generating unit generates the index image based on the content data.

3. The printer according to claim 1, wherein the document data includes a content page containing the table of contents, wherein the content acquiring unit acquires, from the document data, the content page as the information of the table of contents, wherein the index image generating unit generates the index image based on the content page.

4. The printer according to claim 1, wherein the document data includes data of a headline, wherein the content acquiring unit acquires, from the document data, the data of the headline as the information of the table of contents, wherein the index image generating unit generates the index image based on the data of the headline.

5. The printer according to claim 3, wherein the index image generating unit generates the index image by clipping a portion of an image of the content page that contains at least part of the table of contents.

6. The printer according to claim 5, wherein the controller further comprises a proportion setting unit that sets a proportion by which a character in the content page is enlarged or reduced to a size that is larger than or equal to a prescribed character size, wherein the index image generating unit determines a clip size based on the proportion and a prescribed image size such that a size obtained by multiplying the clip size by the proportion is smaller than or equal to the prescribed image size, wherein the index image generating unit clips a portion of the image of the content page in the clip size and enlarges or reduces the portion of the image of the content page by the proportion, thereby generating an index image whose size is smaller than or equal to the prescribed image size.

7. The printer according to claim 1, wherein the index image generating unit generates the index image by clipping a portion of an image of the content page that contains at least part of the table of contents.

8. The printer according to claim 7, wherein the controller further comprises a proportion setting unit that sets a proportion by which a character in the content page is enlarged or reduced to a size that is larger than or equal to a prescribed character size, wherein the index image generating unit determines a clip size based on the proportion and a prescribed image size such that a size obtained by multiplying the clip size by the proportion is smaller than or equal to the prescribed image size, wherein the index image generating unit clips a portion of the image of the content page in the clip size and enlarges or reduces the portion of the image of the content page by the proportion, thereby generating an index image whose size is smaller than or equal to the prescribed image size.

9. A non-transitory computer-readable storage medium storing a set of program instructions executable on a computer retrieving a file including document data, the program instructions comprising:

(a) acquiring information of a table of contents of the document data from the file;

(b) generating an index image depicting the table of contents of the file based on the information of the table of contents; and (c) outputting a list image containing the index image for printing, the acquiring instruction (a) comprising:

(d) determining whether the file includes content data indicative of the table of contents of the document data;

(e) determining whether the document data in the file includes a content page containing the table of contents;

(f) determining whether the document data in the file includes data of a headline, (g) acquiring the content data from the file;

(h) acquiring the content page from the document data; and (i) acquiring the data of the headline from the document data, wherein if the determining instruction (d) determines that the file include the content data, the acquiring instruction (g) acquires the content data and the generating instruction (b) generates the index image based on the content data, wherein if the determining instruction (d) determines that the file does not include the content data and if the determining instruction (e) determines that the document data contains the content page, the acquiring instruction (h) acquires the content page and the generating instruction (b) generates the index image based on the content page, and wherein if the determining instruction (d) determines that the file does not include the content data, if the determining instruction (e) determines that the document data does not contain the content page, and if the determining instruction (f) determines that the document data includes data of the headline, the acquiring instruction (i) acquires the data of the headline from the document data and the generating instruction (b) generates the index image based on the headline.

10. The non-transitory computer-readable storage medium according to claim 9, wherein the file further includes content data indicative of the table of contents of the document data, wherein the acquiring instruction (a) acquires, from the file, the content data as the information of the table of contents, wherein the generating instruction (b) generates the index image based on the content data.

11. The non-transitory computer-readable storage medium according to claim 9, wherein the document data includes a content page containing the table of contents, wherein the acquiring instruction (a) acquires, from the document data, the content page as the information of the table of contents, wherein the generating instruction (b) generates the index image based on the content page.

12. The non-transitory computer-readable storage medium according to claim 9, wherein the document data includes data of a headline, wherein the acquiring instruction (a) acquires, from the document data, the data of the headline as the information of the table of contents, wherein the generating instruction (b) generates the index image based on the data of the headline.

13. The non-transitory computer-readable storage medium according to claim 11, wherein the generating instruction (b)

generates the index image by clipping a portion of an image of the content page that contains at least part of the table of contents.

14. The non-transitory computer-readable storage medium according to claim 13, the program instructions further comprising (e) setting a proportion by which a character in the content page is enlarged or reduced to a size that is larger than or equal to a prescribed character size, wherein the generating instruction (b) determines a clip size based on the proportion and a prescribed image size such that a size obtained by multiplying the clip size by the proportion is smaller than or equal to the prescribed image size, wherein the generating instruction (b) clips a portion of the image of the content page in the clip size and enlarges or reduces the portion of the image of the content page by the proportion, thereby generating an index image whose size is smaller than or equal to the prescribed image size.

15. The non-transitory computer-readable storage medium according to claim 9, wherein the generating instruction (b) generates the index image by clipping a portion of an image of the content page that contains at least part of the table of contents.

16. The non-transitory computer-readable storage medium according to claim 15, the program instructions further comprising (j) setting a proportion by which a character in the content page is enlarged or reduced to a size that is larger than or equal to a prescribed character size, wherein the generating instruction (b) determines a clip size based on the proportion and a prescribed image size such that a size obtained by multiplying the clip size by the proportion is smaller than or equal to the prescribed image size, wherein the generating instruction (b) clips a portion of the image of the content page in the clip size and enlarges or reduces the portion of the image of the content page by the proportion, thereby generating an index image whose size is smaller than or equal to the prescribed image size.

17. The printer according to claim 1, wherein the file includes document data and the content data, the document data having a plurality of document pages, the content data being different from the document data and representing the table of contents.

18. The non-transitory computer-readable storage medium according to claim 9, wherein the file includes the document data and the content data, the document data having a plurality of document pages, the content data being different from the document data and representing the table of contents.

* * * * *